INVENTORS
ROBERT L. DOWLER
RONALD C. SCHROEDER
ATT'Y

United States Patent Office 3,552,227
Patented Jan. 5, 1971

3,552,227
SHIFT CONTROL MECHANISM FOR DUAL RAIL TRANSMISSION
Ronald C. Schroeder and Robert L. Dowler, Fort Wayne, Ind., assignors to International Harvester Company, Chicago, Ill., a corporation of Delaware
Filed Oct. 7, 1968, Ser. No. 765,449
Int. Cl. G05g 5/10
U.S. Cl. 74—477                                9 Claims

ABSTRACT OF THE DISCLOSURE

A single lever actuated shift control mechanism for selectively effecting the engagement and disengagement of a transmission for a four wheel drive vehicle. The mechanism includes a pair of gear controlling rails which are moved longitudinally either individually or together to establish a neutral condition, a low speed forward drive to all four wheels and a high speed forward drive to all four wheels or to only two of the wheels. The various ratios are selected purely by the fore and aft movement of the shift lever.

---

This invention relates to vehicle transmissions and more particularly to a shift control mechanism for controlling same. The control mechanism of the present invention is well suited for controlling the transmission for a vehicle having both front and rear wheel drive.

A transmission control of the general type herein disclosed is shown in the U.S. Patent to Johnston, Jr. and Schroeder No. 3,354,741. This patent teaches the use of a single, manually operable transmission control lever for actuating a pair of gear controlling rails of a transmission for a four-ground-engaging wheel motor vehicle. The transmission to be controlled comprises a transfer case driven by a multi-speed transmission for transmitting driving torque to either the rear wheels alone or both the front and rear wheels. The gear shift lever is moved both fore-and-aft and transversely to accomplish the various shifts.

The transmission control should be designed to eliminate the transmission of torque only to the front wheels for either high or low speed ratios. In the present case, such elimination is accomplished in the design of the transfer case. It is desirable also to require that torque be transmitted to both the front and rear wheels in the low speed gear ratio. A two-wheel drive only in low speed gear ratio would result in excessive torque being transmitted to the two driven wheels.

SUMMARY OF THE INVENTION

It is an object of the present invention to provide a single lever actuated control mechanism for a transmission comprising a pair of shift rails that are moved longitudinally either separately or concurrently to select the various driving gear ratios. The motion of the rails either separately or together is controlled by a guide pin and channel and interlock pins in the housing of the transfer case that engage the rails to control their motion. No transverse motion of the shift lever is required.

It is a more particular object to provide a shift control mechanism for a transmission having a single, manually operated shift lever interconnected with a pair of parallel, longitudinally movable gear selecting rails by means of a swing link, a guide block or collar for retaining the rails and defining their degree of freedom of motion, a guide pin carried by the swing link and adapted to engage a guide channel formed in the collar, and a pair of interlock pins adapted to engage grooves formed in the rails so as to require longitudinal motion of one or the other of the rails separately or both together throughout the limits of longitudinal or fore-and-aft movement of the shift rail. The gear selecting rails are interconnected with appropriate shift forks or yokes within the transfer box to accomplish the required shifts.

The control mechanism of the present invention has the advantages of being easier to manufacture, lower in cost, less complex, and easier to shift than existing control mechanisms. All of the required gear ratios are obtained simply by moving the shift lever longitudinally, or with one degree of freedom. No transverse motion of the lever is desired or required.

Other objects and advantages will become more apparent when considered in connection with the following drawings in which.

Figure 1:
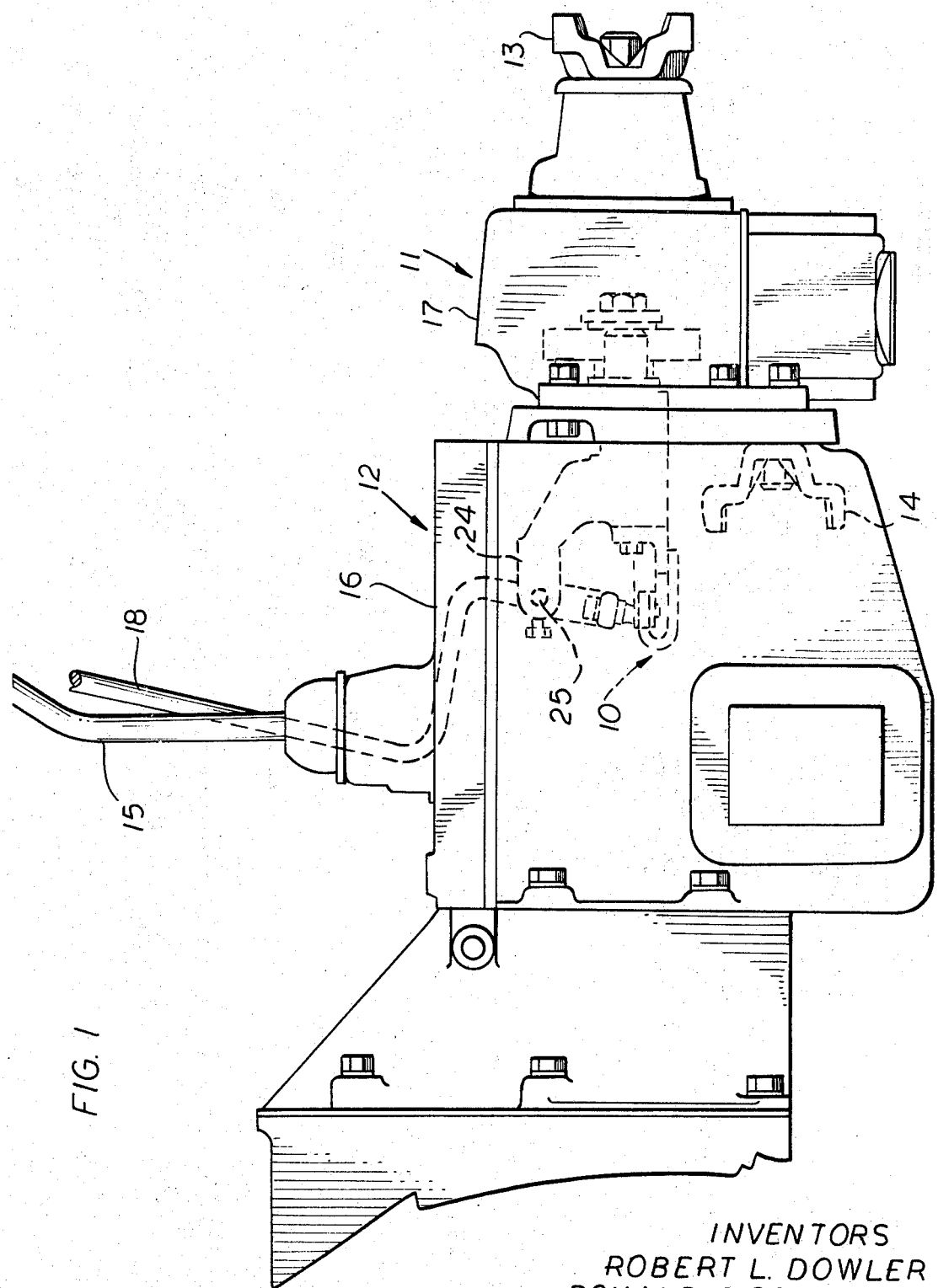
FIG. 1 is a view in elevation of a transmission and transfer box and showing the orientation of the control mechanism of the present invention.

Referring now to the drawings wherein like reference characters designate like parts in the several views, the transmission shift control mechanism of the present invention is designated generally by the numeral 10 and is adapted to control the driving gear ratios within a transfer box 11. The transfer box 11 is driven by a conventional transmission 12 and is effective to transmit torque to the rear wheels of the vehicle through a coupling 13, and to the front wheels through a coupling 14. The transmission 12 is controlled by a shift lever 15. The internal construction and operation of the transmission 12 and transfer box 11 are not critical for an understanding of the present invention. The transfer box 11 may be constructed as shown in the above mentioned U.S. Patent to Johnston and Schroeder No. 3,354,741 or in the U.S. Patent to Kaiser, No. 3,283,298.

The shift control mechanism 10 is disposed partially within a housing 16 for the transmission 12 and extends into a housing 17 for the transfer box 11. The mechanism 10 is operated by a manual shift lever 18 which is located in close proximity to the shift lever 15. The shift lever 18 is moved fore and aft, or to the left and right, respectively, as shown in FIG. 1 to operate the shift control mechanism 10.

Figure 2:
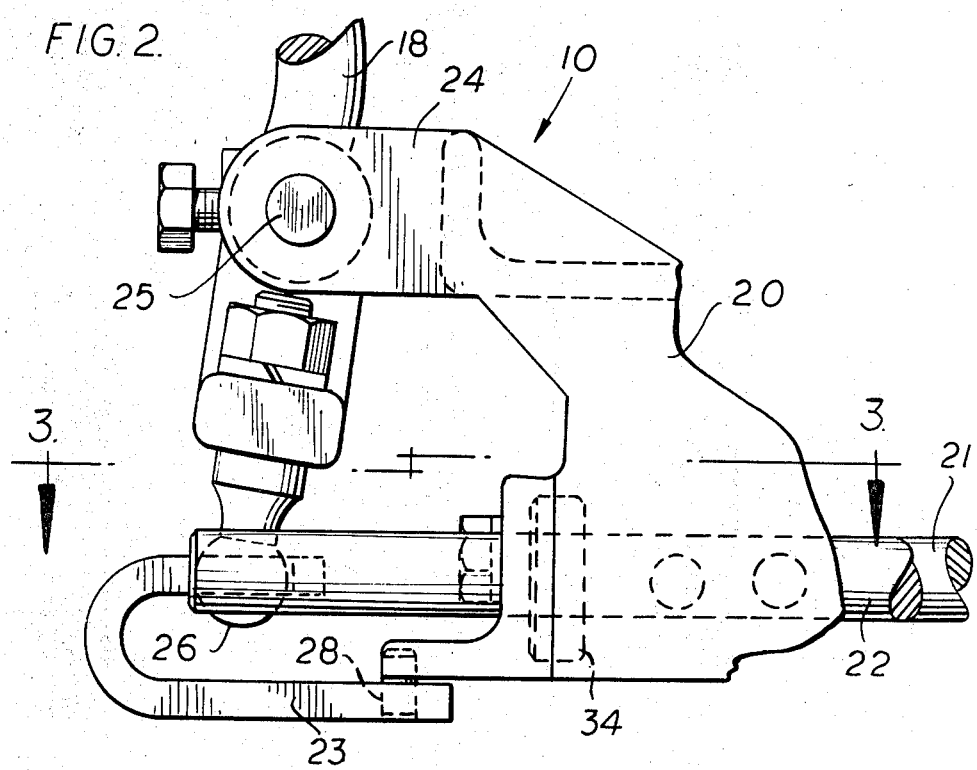
FIG. 2 is an enlarged view in elevation of the control mechanism.
Figure 3:
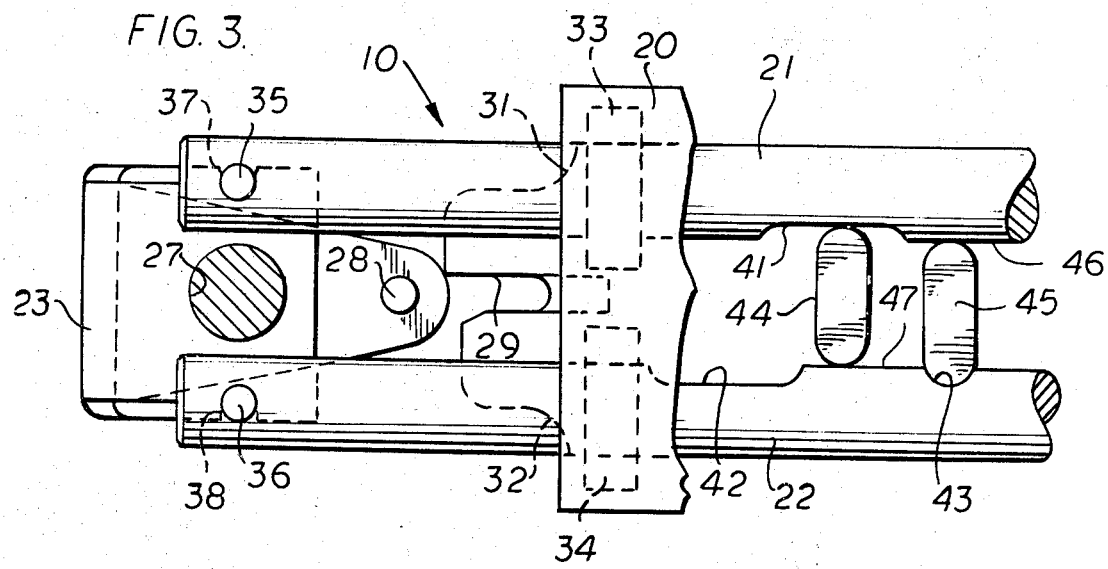
FIG. 3 is a top view taken on line 3—3 of FIG. 2 and showing the rails in the Four Wheel High position.

Referring now to FIGS. 2 and 3, the shift control mechanism 10 is seen to comprise the shift lever 18, a guide block or casting 20, a front axle shift rail 21, a rear axle shift rail 22, and a swing link 23. The guide block 20 is formed with a fork or yoke 24 which pivotally supports the shift lever 18 by means of a pivot pin 25. The axis of the pin 25 is transverse to the longitudinal axes of the rails 21 and 22, and the pin 25 constrains the lever 18 to move only in a fore-and-aft direction with this being its one degree of freedom. The shift lever 18 is attached to the swing link 23 by means of a shift ball 26 bolted to the lower end of the lever 18. The shift ball 26 is received within a cylindrical aperture 27 formed in the link 23. The swing link 23 is generally U shaped in form and carries a guide pin 28 adapted to engage a keyway or channel 29 formed in the block 20.

The shift rails 21 and 22 are generally in the form of cylindrical rods disposed parallel to each other and constrained to be moved longitudinally through cylindrical bores 31 and 32 formed in the guide block 20. A pair of seals 33 and 34 are mounted within the block 20 and support the rails 21 and 22, respectively. The rails 21 and 22 are connected to the swing link 23 by means of pins 35 and 36, respectively. The pins 35 is fixedly attached to the rail 21 and is disposed in a notch 37 formed in the link 23. Similarly, the pin 36 is attached to the rail 22 and disposed in a notch 38. This manner of attachment of the rails 21 and 22 to the swing link 23 constrains the rails to be moved longitudinally when the link 23 is moved longitudinally, and also permits the link 23 to swing arcuately about a vertical axis so as to move only one of the rails for one stage of operation to be described more completely hereinafter.

The shift rail 21 is formed with a longitudinal groove 41 throughout a portion of its length, and the shift rail 22 is formed with a groove 42 and notch 43. The rails 21 and 22 are disposed with the grooves 41 and 42 facing each other and adapted to receive a pair of interlock pins 44 and 45. The axial length of the pins 44 and 45 is greater than the spacing between the inner surfaces 46 and 47 of the rails 21 and 22, respectively, so that relative movement of one rail with respect to the other is permitted only when the ends of the interlock pins ride in the grooves 41 and 42. The pins 44 and 45 are mounted within the block 20 so as to be freely movable along their own axes, but are not permitted to move longitudinally with the shift rails 21 and 22.

Figure 4:
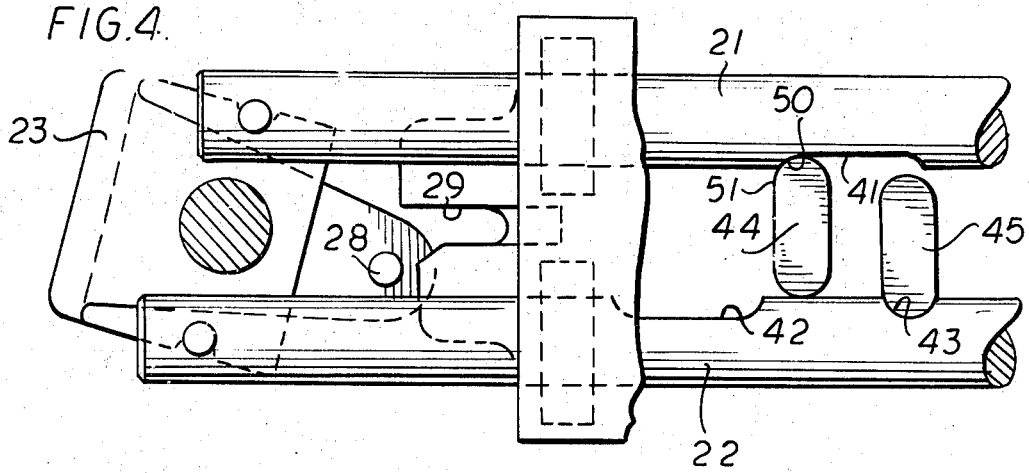
FIG. 4 is a top view showing the rails in the Two Wheel High position.

FIG. 3 shows the shift control mechanism 10 in its Four Wheel High position, corresponding to the aft-most limit of motion of the shift lever 18. A shift from this condition into Two Wheel High position, as shown in FIG. 4, is accomplished by moving the shift lever 18 forward slightly. Such motion of the lever 18 tends to move the link 23 and rails 21 and 22 to the right as shown. However, the interlock pin 45 is engaged in the notch 43 in rail 22 and does not permit this rail to move. Consequently, the link 23 swings arcuately into the position shown in FIG. 4 and causes the front axle rail 21 to move to the rear, or to the right as shown. Rearward movement of the rail 21 stops when the end 50 of the groove 41 engages the spherical end 51 of pin 44. This movement is sufficient to effectuate disengagement of the drive to the front wheels so that now only a Two Wheel High condition exists. It should be noted that for this shift the guide pin 28 is free of the channel 29. It should also be noted that the length of the groove 41 is such that the interlock pin 45 now is free to move into groove 41 and the rear axle shift rail 22 is free to move.

Figure 5:
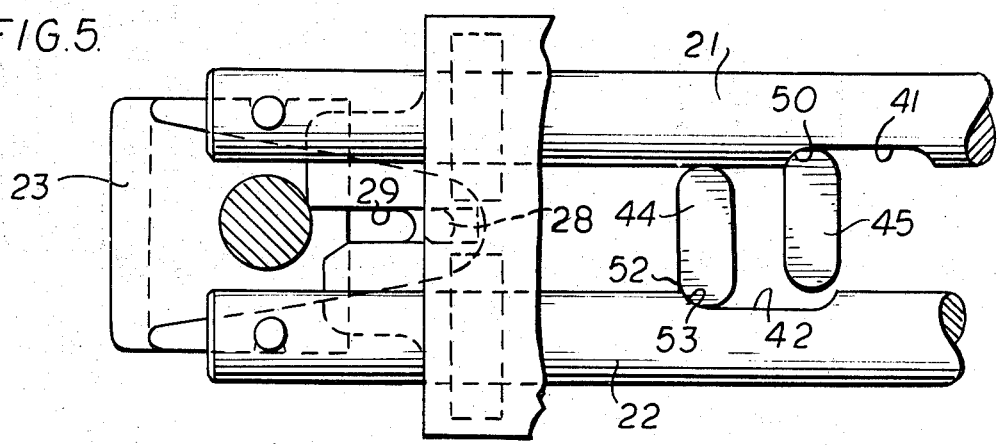
FIG. 5 is a top view showing the rails in the Four Wheel Low position.

A shift into Four Wheel Low position, as shown in FIG. 5, is accomplished by continued forward movement of the shift lever 18. Such motion tends to move the link 23 and rails 21 and 22 to the rear, or to the right as shown, but the rail 21 is prevented from moving further by the interlock pin 44. The link 23 is caused to swing back into its normal position, moving the rail 22 rearwardly and allowing the pin 44 to fall into the groove 42. The guide pin 28 enters the channel 29 and constrains the link 23 and rails 21 and 22 to move rearwardly concurrently to the limit of their motion to the right. The position shown in FIG. 5 defines the Four Wheel Low condition. It should be noted that the guide pin 28 travelling in the channel 28 prevents independent motion of either of the rails 21 and 22 so that a low speed drive to one or the other sets of wheels is effectively prevented. It is important that this condition exist so that excessive torque is not transmitted to only one axle in low.

Figure 6:
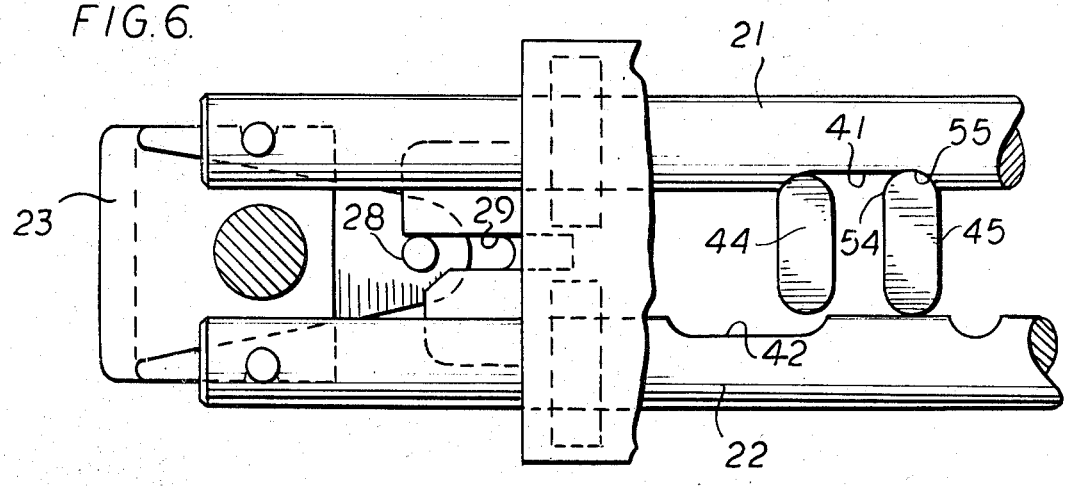
FIG. 6 is a top view showing the Neutral position.

A neutral condition is obtainable, as shown in FIG. 6, by moving the shift lever 18 slightly rearward from the position of FIG. 5, or slightly forward from the position of FIG. 4. In this condition both front and rear axles are disengaged so that no troque is transmitted to either set of wheels. Forward motion of the shift lever 18 from the position shown would cause the guide pin 28 to reenter the channel 29 and establish Four Wheel Low, as previously described; and rearward motion of the lever 18 would establish either Two Wheel or Four Wheel High depending on the extent of rearward motion.

The Two Wheel High condition would be established first by rearward motion of the shift lever 18. Such motion would tend to move the link 23 and rails 21 and 22 forward, but the engagement of the spherical end 54 of the pin 45 with the end 55 of groove 41 prevents the rail 21 from moving. The link 23, therefore, swings into the position shown in FIG. 4. At this stage, the pin 45 falls into the notch 43 and the rail 21 is now free to move forwardly, but the motion of rail 22 is now restrained by the engagement of the pin 45 in notch 43. Continued rearward motion of the lever 18 causes the link 23 to swing into central or normal position and the rail 21 moves into the Four Wheel High position shown in FIG. 3.

There has been shown and described by this invention a new and efficient shift control mechanism for controlling the transmission of driving torque to either the driving rear wheels of a vehicle or to both the front and rear wheels simultaneously. The control mechanism is effective to prevent the transmission of torque to only one set of wheels in low speed drive. All shifts of the transmission are accomplished by simple fore-and-aft movement of a shift lever, that is, with only one degree of freedom. The control mechanism is more efficient, lower in cost, simpler in construction, and more positive in operation than other known shift control devices.

While a preferred embodiment of the invention has been specifically disclosed, it is to be understood that the invention is not limited thereto as other variations will be apparent to those skilled in the art and the invention is to be given its fullest possible interpretation within the terms of the following claims.

We claim:

1. In a power transmission mechanism, a pair of shiftable rails, said rails each being shiftable in opposite directions from a "neutral" position; stationary support means for supporting said rails; interlock means operatively engaging said rails and being operable to permit said rails to be shiftable independently of each other from their "neutral" position when force is applied thereto in one direction, said interlock means permitting one of said rails to be shiftable only after the other rail has been shifted to a predetermined position, said interlock means being operable to permit shifting of said rails in unison from their "neutral" position when force is applied thereto in the opposite direction; and means for applying forces to said rails to effect shifting of said rails in both directions from their "neutral" positions including control lever means, and means operatively interconnecting said control lever means and said rails, said control lever means being movable to impart forces to said rails tending to shift them to and from their "neutral" positions in both directions; and guide means associated with said means operatively interconnecting said control lever means and said rails and operatively engageable with said stationary support means only during a portion of the range of movement of said control lever means, said guide means being effective to cause concurrent shifting of said rails when in operative engagement with said stationary support means.

2. In a power transmission mechanism as set forth in claim 1, wherein said means operatively interconnecting said control lever means and said rails includes a movable link having each of its end portions pivotally connected to a respective one of said rails; and said guide means includes a pin carried by said link and a channel formed in said stationary support means, said pin being receivable within and confined by said channel during a portion of the range of motion of said control lever means.

3. In a power transmission mechanism as set forth in claim 2, wherein said control lever means includes a single manually movable control lever, and means for operatively connecting said control lever to said stationary support means, said means being effective to constrain said control lever to move with only one degree of freedom.

4. In a power transmission mechanism as set forth in claim 1, wherein said rails are spaced and substantially parallel with respect to each other, said rails being supported by said stationary support means for shifting along their longitudinal axes; and wherein said control lever means includes a single manually movable control lever, and means for operatively connecting said control lever to said stationary support means, said means being effective to constrain said control lever to move with only one degree of freedom.

5. In a power transmission mechanism as set forth in claim 4, wherein said interlock means comprises a pair of longitudinally spaced pins supported by said stationary support means for sliding movement along parallel axes normal to the longitudinal axes of said rails, said interlock pins being disposed between and operatively engaging said rails, said interlock pins being operable to permit said rails to be shiftable only independently and sequentially of each other between their "neutral" and first positions, said interlock pins being automatically operable to permit shifting of said rails in unison between their "neutral" and second positions.

6. In a power transmission mechanism for a motor vehicle having front wheel means and rear wheel means operatively connected to the power transmission mechanism, a pair of substantially parallel, reciprocal gear actuating rails, each of said rails being shiftable for controlling the drive condition of a respective one of said wheel means, each of said rails being shiftable along its longitudinal axes in opposite directions to "low" and "high" positions corresponding to "low" and "high" speed drive conditions, respectively, of a respective wheel means from an intermediate "neutral" position; interlock means disposed between and operatively engaging said rails, said interlock means being operable to permit said rails to be shiftable only independently and separately of each other between their "neutral" and "high" positions, said interlock means being automatically operable to permit shifting of said rails in unison between their "neutral" and "low" positions; and means for imparting forces to said rails tending to shift them between their "neutral," "high," and "low" positions including a single control lever operatively connected to said rails and pivotally supported for pivotal movement in only one plane, said control lever imparting forces to said rails tending to shift them between their "neutral" and "high" positions upon pivotal movement thereof in a first portion of the entire range of movement of the control lever and imparting forces to said rails tending to shift them between their "neutral" and "low" positions upon pivotal movement thereof in a second portion of the entire range of movement of the control lever.

7. In a power transmission as set forth in claim 6, wherein said means for imparting forces to said rails tending to shift them between their "neutral," "high," and "low" positions further includes a link operatively connected to one end of said control lever, each of said rails being pivotally connected to a respective one of a pair of transversely spaced portions of said link, said link being effective upon pivotal movement of said control lever in its first portion of the entire range of movement of the control lever to cause said link to pivot sequentially with respect to said rails in opposite directions and effect sequential and independent longitudinal movement of said rails; and guide means for preventing pivotal movement of said link with respect to said rails upon pivotal movement of said control lever in its second portion of the entire range of movement of the control lever whereby said rails are caused to move longitudinally simultaneously.

8. In a power transmission mechanism as set forth in claim 7, including stationary support means, said support means supporting said rails for relative longitudinal sliding movement; and said guide means for preventing pivotal movement of said link with respect to said rails upon pivotal movement of said control lever in its second portion of the entire range of movement of the control lever includes a pin carried by said link and a longitudinally extending channel formed in said stationary support means, said pin being receivable within and confined by said channel during pivotal movement of said control lever in its second portion of the entire range of movement of the control lever.

9. In a power transmission mechanism as set forth in claim 8, wherein said interlock means comprises a pair of longitudinal pins supported by said stationary support means for sliding movement along parallel axes normal to the longitudinal axes of said rails, said interlock pins being disposed between and operatively engaging said rails, said interlock pins being operable to permit said rails to be shiftable only independently and sequentially of each other between their "neutral" and "high" positions, said interlock pins being automatically operable to permit shifting of said rails in unison between their "neutral" and "low" positions.

References Cited
UNITED STATES PATENTS

| | | | |
|---|---|---|---|
| 2,265,378 | 12/1941 | Lawler | 74—477 |
| 3,292,451 | 12/1966 | Jacklin et al. | 74—477 |
| 3,354,741 | 11/1967 | Johnston, Jr. et al. | 74—477 |

MILTON KAUFMAN, Primary Examiner